United States Patent Office 3,007,952
Patented Nov. 7, 1961

3,007,952
ORGANO-PHOSPHORUS COMPOUNDS AND PREPARATION
Joseph Z. Matt, Chicago, Ill., and Walter A. Schroeder, Philadelphia, Pa., assignors, by mesne assignments, to Armour and Company, Chicago, Ill., a corporation of Delaware
No Drawing. Filed Sept. 10, 1956, Ser. No. 608,714
14 Claims. (Cl. 260—403)

This invention relates to organic phosphorus compounds and to their preparation. It relates more particularly to organo-phosphorus compounds having an aliphatically bound carboxylic group and a phosphonic acid group and to their preparation by a process of oxidative phosphonation.

It is an object of the present invention to provide new organic phosphorus compounds. A further object is to provide new compounds derived from fatty acids and containing phosphorus which have useful properties as surface active agents. A more specific object is to provide a process for the introduction of the monovalent phosphono radical $(HO)_2PO-$ into a fatty acid or fatty acid ester. Other objects and advantages of the invention will appear as the specification proceeds.

In the process of this invention oxygen is passed into a mixture of phosphorus trichloride and a compound such as a fatty acid or fatty acid ester which contains an aliphatically bound replaceable hydrogen atom. Two to five moles of phosphorus trichloride are used to each mole of the fatty acid or fatty acid ester. In the reaction of esters the temperature of the reaction mixture gradually rises to about 75° C. when oxygen is introduced. After several hours the reaction temperature falls to about 25° C., or to room temperature, and the reaction is complete. When phosphorus trichloride is mixed with a fatty acid there immediately ensues a vigorous reaction in which an acyl chloride is formed as the hydroxyl group of the carboxyl group is replaced by a chlorine atom. During this reaction phosphorus acid is produced. After this reaction is completed the phosphorus acid is removed and oxygen gas passed through the reaction mixture. As in the reaction above the temperature gradually rises, then returns to room temperature when the reaction is completed. Phosphorus oxychloride and excess phosphorus trichloride are then removed in vacuum leaving a residue of the phosphonated fatty acid ester or fatty acid. The reaction proceeds to the monosubstitution stage, i.e. one aliphatically bound hydrogen atom is replaced by a $-POCl_2$ radical. These reaction products can be treated in various ways to produce the various compounds of the invention.

The reaction products from the phosphonation of either a fatty acid or a fatty acid ester may be saponified with an alkali metal hydroxide, e.g. NaOH, in which case the trialkali metal salt of the phosphono-fatty acid is formed. These salts contain a hydrophobic alkyl group and the hydrophilic carboxylic and phosphonic acid salt groupings. They have been found to possess valuable surface active properties.

Where the compound phosphonated according to the process of this invention is an ester, e.g. a methyl ester, the reaction mixture containing the phosphonated methyl ester may be neutralized with aqueous sodium carbonate followed by extraction of the unreacted ester with an organic solvent. The product is the disodium carbomethoxy-alkylphosphonate. This disodium salt has been found to possess valuable surface active properties.

Careful acidification of the disodium salt yields the carbomethoxy-alkylphosphonic acid. Strong saponification, as shown above, will cleave the ester linkage and will result in the formation of the trisodium salt.

In a study of this reaction with the lower members of the aliphatic series, e.g. methyl butyrate, close-boiling phosphonated fractions were obtained, indicating various positions of substitution. The fact that methanol could be obtained from the product indicated that some, if not all, of the methyl groups of the ester escaped phosphonation.

The products of this oxidative phosphonation reaction are mixtures because of the random phosphonation. Since the products decompose easily upon heating, distillation is not practical as a method of purification. Purification is therefore preferably effected by extraction procedures.

The following specific examples of these novel compounds and of their preparation will further illustrate the invention.

EAXMPLE I

*Preparation of a phosphono-fatty acid and salt*

A fatty acid sold by Armour and Company under the trademark Neo-Fat 12 is composed of 90% lauric acid, 9% myristic acid, and 1% oleic acid. About one mole (200.0 gms.) of this fatty acid was mixed with about 3 moles (414.0 gms.) of $PCl_3$ and placed in a three-necked round-bottom flask which was fitted with a thermometer, gas dispersion tube and condenser with anhydrous $CaCl_2$ tube attached.

In the initial vigorous reaction the acid chloride was formed together with phosphorous acid which slowly settled out. The mixture was allowed to stand overnight to complete this reaction. After the phosphorous acid was removed oxygen gas was passed through the mixture. The temperature rose as the reaction proceeded, then gradually returned to room temperature indicating the completion of the reaction.

The reactants were then placed under a water vacuum for several hours to remove $POCl_3$ and any unreacted $PCl_3$ present. A slight heat was used near the end of this period to insure the complete removal of $PCl_3$.

The resulting mixture was then subjected to strong saponification in aqueous sodium hydroxide solution. During this vigorous reaction a brown solid precipitate settled out. The saponification was carried out over a steam bath after the initial reaction had subsided.

After saponification the mixture was boiled on a hot plate until complete solution was secured. Aqueous hydrochloric acid was then added causing a vigorous reaction during which an oil settled out. The solution was made definitely acid and boiled. After boiling, the solution was cooled and a precipitate settled out. The precipitate was separated, dissolved in absolute ethyl ether, dried over anhydrous sodium sulfate, and decolorized by boiling with activated carbon. A clear brown solution containing the phosphonated fatty acids remained after filtering off the sodium sulfate and carbon.

Sodium methylate was added to the solution to form the salt. The precipitated salt was recrystallized from isopropyl alcohol and dried under vacuum. This product was the trisodium salt of the phosphonated fatty acids. It was soluble in cold water and had good foaming properties.

EXAMPLE II

*Phosphonation of "coco" methyl ester*

The "coco" methyl ester used in this experiment was prepared from the fatty acids derived from coconut oil. The coconut oil used was of the following composition:

8% caprylic acid          9% palmitic acid
7% capric acid            2% stearic acid
17% myristic acid         6% oleic acid
49% lauric acid           2% linoleic acid About 1 mole (220 gms.) of "coco" methyl ester and 2 moles (276 gms.) of PCl$_3$ were mixed together and reacted. There was no vigorous initial reaction as in Example I since the carboxyl group here was esterified and no free hydroxyl group was present. There was no phosphorous acid formed. Oxygen was passed through the mixture until the reaction was complete. The temperature of the mixture rose immediately upon introduction of the oxygen and returned to room temperature at the completion of the reaction. The reaction mixture was then subjected to a vacuum with slight heating to remove the excess PCl$_3$ and POCl$_3$. The solution containing the ester, in which an aliphatically bound hydrogen had been replaced by a —POCl$_2$ group, was then divided in half in order to make two different products, one a trisodium salt of the phosphono fatty acid, and the other a disodium salt of the phosphonated "coco" methyl ester.

EXAMPLE II-A

To prepare the first-mentioned product, the trisodium salt, one half of the solution was subjected to strong saponification. The solution was added to an aqueous NaOH solution. After the initial vigorous reaction, in which the chlorine attached to the phosphorus was removed, the saponification was continued on a steam bath.

After saponification the mixture was boiled on a hot plate until complete solution was effected. Aqueous hydrochloric acid was then added causing a vigorous reaction. The solution was made definitely acid and complete solution attained by boiling. After boiling the solution was cooled and an oil then settled out. The oil was separated and dissolved in absolute ethyl ether. This ether solution was dried over anhydrous sodium sulfate and was decolorized by boiling with activated carbon. A brown solution remained after filtration.

Sodium methylate was then added to the solution and a precipitate was formed immediately. This precipitate was dissolved in ethanol, reprecipitated with ethyl ether, filtered and dried over a vacuum. This product was the trisodium salt of the phosphonated fatty acid. It was soluble in cold water and had excellent foaming properties.

EXAMPLE II-B

The remaining half of the original reaction mixture was added to a sodium bicarbonate solution. An excess of sodium bicarbonate was used to maintain a basic pH. The unreacted ester came out of solution as an oil and was removed from the reaction mixture. The disodium salt remaining in the separatory funnel was washed with Skellysolve, ethyl ether and isopropyl alcohol. The product, disodium carbomethoxy "coco" phosphonate, was then precipitated from the solution and recrystallized.

EXAMPLE III

*Preparation of diethanolamine salt of carbomethoxyundecylphosphonic acid*

In a reaction similar to that described in Example II above, 214 gms. of C$_{11}$H$_{23}$CO$_2$CH$_3$ (methyl laurate) was mixed with 412 gms. of PCl$_3$ and oxygen was bubbled through the mixture until no further difference existed between the temperature of the reaction mixture and room temperature. The reaction mixture was then placed in a vacuum to remove volatile material. Fifty grams of this crude product was poured into ice water and extracted with absolute ethyl ether. The ether solution was then dried over anhydrous Na$_2$SO$_4$ and filtered, the filtrate was placed under vacuum to remove volatile material, and the residue was then filtered again. The final filtrate, a light-brown liquid, was then mixed with 96 gms. of diethanolamine. Heat was liberated and some solid formed. The mixture was refluxed for 3 hours. A dark-yellow, highly viscous oil was obtained. This material, the diethanolamine salt of carbomethoxyundecylphosphonic acid, was very soluble in water. It formed a clear solution and foamed quite well. The water solution was quite basic, having a pH of about 8 or 9.

Many modifications and variations of the invention described in the foregoing examples will occur to those skilled in the art and the examples are therefore understood to be illustrative only and not limiting of the invention.

Having particularly described the invention, we claim:
1. Carbomethoxyundecylphosphonic acid.
2. Trisodium phosphonolaurate.
3. Disodium carbomethoxyundecylphosphonate.
4. The process of reacting a saturated hydrocarbon fatty acid having from 8 to 18 carbon atoms in the hydrocarbon radical thereof with phosphorus trichloride in the presence of oxygen.
5. In a preparation of a phosphono-fatty acid the steps of reacting a saturated hydrocarbon fatty acid having from 8 to 18 carbon atoms in the hydrocarbon radical thereof with phosphorus trichloride in the presence of oxygen, saponifying the reaction mixture with an alkali metal hydroxide, acidifying the reaction mixture and separating out the reaction product.
6. A compound having the formula RCO$_2$H wherein R represents a saturated aliphatic hydrocarbon radical having from 8 to 18 carbon atoms therein and having an aliphatically bound hydrogen atom thereof replaced by a monovalent phosphonic acid radical of the formula —PO$_3$H$_2$.
7. An alkali metal salt of the compound of claim 6.
8. A salt of the compound of claim 6 wherein the base is an organic base.
9. A compound having the formula

wherein R represents a saturated aliphatic hydrocarbon radical having from 8 to 18 carbon atoms therein and having an aliphatically bound hydrogen atom thereof replaced by a monovalent phosphonic acid radical of the formula —PO$_3$H$_2$ and wherein R$_1$ represents a monovalent saturated aliphatic hydrocarbon radical having from 1 to 4 carbon atoms.
10. An alkali metal salt of the compound of claim 9.
11. A salt of the compound of claim 9 wherein the base is an organic base.
12. The process of reacting a compound having the formula

wherein R represents a saturated aliphatic hydrocarbon radical having from 8 to 18 carbon atoms therein, and wherein R$_1$ represents a monovalent saturated aliphatic hydrocarbon radical having from 1 to 4 carbon atoms therein with phosphorous trichloride in the presence of oxygen.
13. The process of reacting a compound having the formula

wherein R represents at saturated aliphatic hydrocarbon radical having from 8 to 18 carbon atoms therein, and wherein R$_1$ represents a monovalent saturated aliphatic hydrocarbon radical having from 1 to 4 carbon atoms therein with phosphorous trichloride in the presence of oxygen saponifying the reaction product with an alkali metal hydroxide, acidifying the resulting phosphono-fatty acid salt, and separating out the phosphono-fatty acids so formed.
14. A compound of the formula

wherein $R_1$ is selected from the group consisting of hydrogen, a monovalent alkali metal radical, and a monovalent saturated aliphatic hydrocarbon radical having from 1 to 4 carbon atoms and wherein R represents a saturated, aliphatic hydrocarbon radical having from 8 to 18 carbon atoms therein and having an aliphatically bound hydrogen atom thereof replaced by a phosphonic radical of the formula $-PO_3(R_2)_2$ wherein $R_2$ represents a material selected from the group consisting of hydrogen, an alkali metal radical and an organic base.

References Cited in the file of this patent

Kosolapoff: Organo Phosphorus Compounds, pp. 66 and 134 (1950 edition), John Wiley & Sons, New York, New York.

Bochwic et al.: 167, 1035 (1951), cited in Chem. Abstracts 46, 885[h] (1952).

Kabachnick et al.: Izvest. Akad. Nauk., SSSR-Otdel Khim Nauk., 1953, 163–176, cited in Chem. Abstracts 48, 3244[d].